INVENTOR.
HARVEY GORDON HANSEN
BY
ATTORNEY

July 18, 1950  H. G. HANSEN  2,515,598
SPRAYING DEVICE

Filed Feb. 13, 1946  2 Sheets-Sheet 2

INVENTOR.
HARVEY GORDON HANSEN
BY
ATTORNEY

Patented July 18, 1950

2,515,598

UNITED STATES PATENT OFFICE 2,515,598

SPRAYING DEVICE

Harvey Gordon Hansen, San Leandro, Calif.

Application February 13, 1946, Serial No. 647,360

2 Claims. (Cl. 299—18)

This invention relates to improvements in spray devices and more particularly to an improvement in lawn sprinkling equipment.

Lawn sprinklers of the usual and common form spray circular sections. In order to water an entire lawn, it has been necessary to overlap portions of the circles. As a consequence, certain segments of the overlapping circles are overwatered while other portions of the lawn may be neglected; to cover some portions of the lawn, water must be wasted by application to uncultivated areas such as walks, driveways and the like to ensure application to an adjacent area.

This invention has for its principal object the provision of a novel form of lawn sprinkler which enables water to be sprayed about the sprinkler on a rectangular-shaped area, preferably one of a square form. By moving the sprinkler about, successive rectangular shaped areas may be sprayed so that their marginal edges abut the adjacent watered marginal edge of another section. Thus it is not only possible to water a greater area in less time, a rectangular area having a greater area than a circle of the same diameter, but it is possible also to water only the lawn portion without wasting water on walks and driveways or other uncultivated areas.

In general it is the broad object of the present invention to provide a novel form of lawn sprinkler particularly adapted to spray a section of lawn that is relatively large and which is square in shape as measured about the sprinkler.

The invention includes other objects and features of advantage, some of which, together with the foregoing, will appear hereinafter wherein the present preferred form of sprinkling device of this invention is disclosed.

In the drawings accompanying and forming a part hereof, Figure 1 is a side elevation of the lawn sprinkler embodying the present invention.

Figure 1:
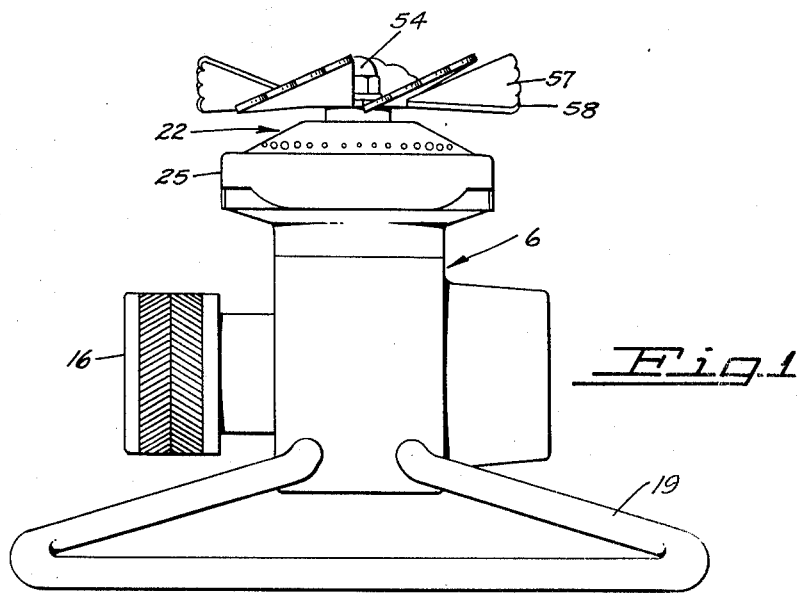
Figure 2:
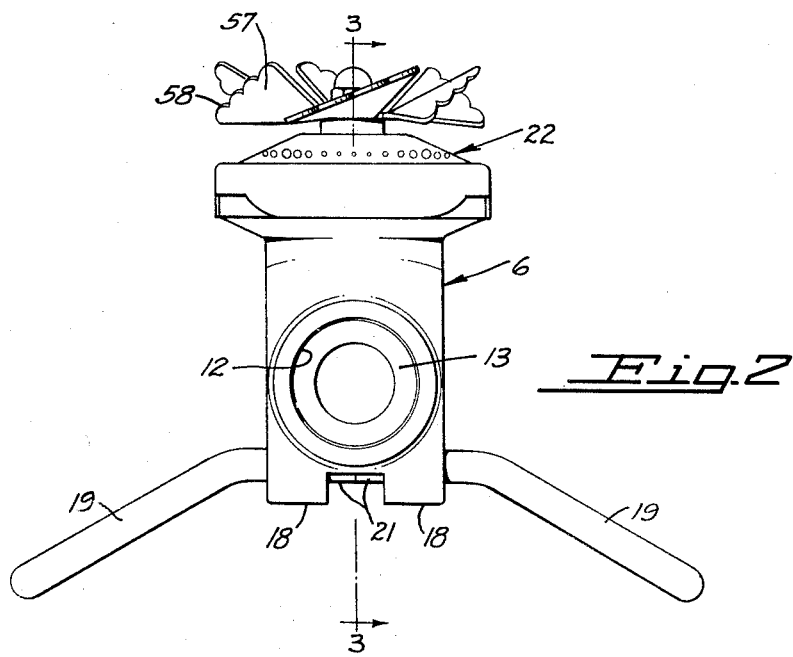
Figure 2 is an end elevation of the sprinkling device shown in Figure 1.
Figure 3:
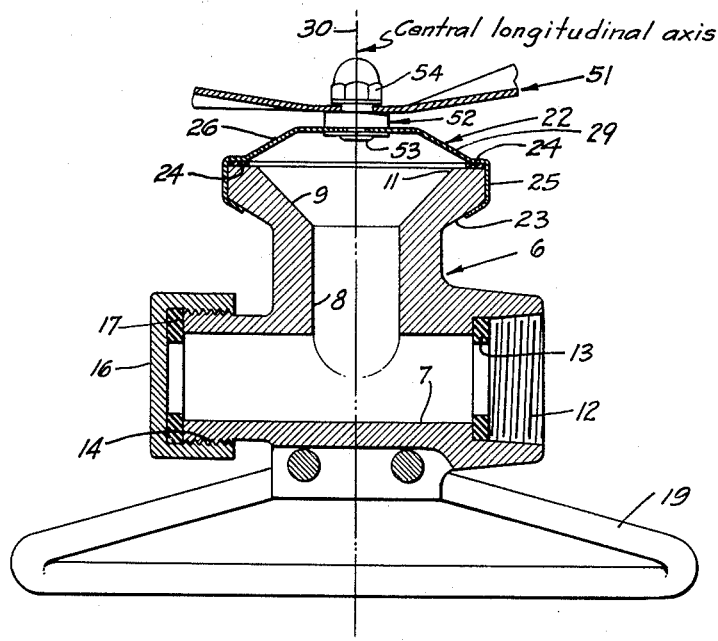
Figure 3 is a section taken through the device along the line 3—3 in Figure 2.

Referring to the structure shown in the drawings, and wherein I have shown a successful lawn sprinkler, numeral 6 is applied to a body portion having a central passageway 7. The latter leads into one end of a vertical passageway 8 which is flared outwardly at its other end 9 to terminate in a relatively large aperture 11. At each end of the central passage 7, body 6 is provided with suitable threaded connections to permit attachment of a conduit such as a flexible hose or a pipe. Thus, threads 12 are provided within the body to admit of attachment to a usual threaded connection, a washer 13 being provisioned in the body. On the other end of the body, threads 14 are provided to admit of attachment of another connection so that the sprinklers can be used in tandem, if desired. In the form shown, a cap 16 is shown in place on threads 14, a washer 17 being interposed between the cap and the end of the body 6.

The body includes two spaced depending portions 18 in which are inserted ends 21 of suitable heavy wire members 19 bent into a suitable shape to provide a support or base for the body 6.

Means are provided for distributing liquid delivered to aperture 11 in the form of a rectangular or square about the central longitudinal axis of the sprinkler. This means comprises head member 22. Preferably this is made in the form of a stamping to fit over the rectangular end of body 6, tongues 25 depending from the head member and being bent around shoulders 23, a gasket 24 being interposed between the upper end of the body 6 and the head member to seal the head member on the body.

The head member includes an annular portion 26 concentrically positioned about the central longitudinal axis 30 of the sprinkler and extending inwardly toward the axis and upwardly in the direction in which passage 8 extends. A plurality of apertures indicated generally at 29 are bored in the concentric annular portion 26 so that these point upwardly and outwardly away from the sprinkler to direct liquid delivered to the apertures away from the sprinkler in a plurality of fine streams.

Figure 4:
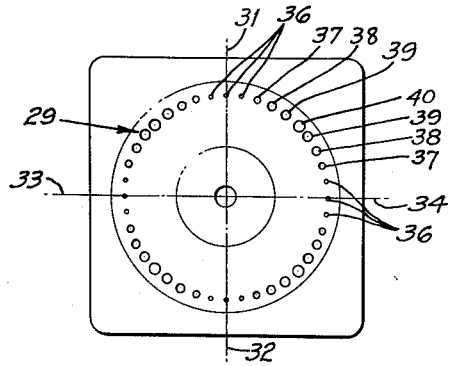
Figure 4 is a plan view of the head member utilized on the sprinkler.
Figure 5:
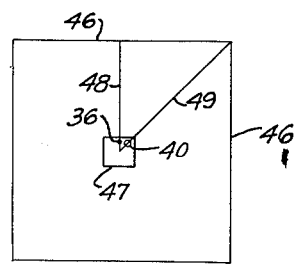
Figure 5 is a diagram illustrating the application of water to an area about the sprinkler.

In one form of device which embodies the invention, forty apertures were bored in a circle concentric about the central longitudinal axis, being spaced 9° apart. For convenience in describing these, I will consider that the circle on which the apertures 29 are provided is divided into four quadrants by the lines 31, 32, 33 and 34, as appears in Figure 4. Nine apertures are included within each quadrant, two apertures being common to each two adjacent quadrants. Of these, apertures 36 were 0.040 inch in diameter. The next four apertures were all of a different size, being increasingly larger, the four apertures being indicated 37, 38, 39 and 40. Then, proceeding around the quadrant, the apertures again decrease in size as I have indicated in the application of numerals 39, 38, 37 and 36. Apertures 37, 38, 39 and 40 were respectively 0.042, 0.0465, 0.055 and 0.0635 inch in diameter. In any case, and irrespective of the number of apertures, the area of each aperture should be a function of the distance measured from the aperture along a line passed through the aperture and the central longitudinal axis of the sprayer to the outer peripheral edge of the area to be sprayed. Thus, referring to Figure 5, I have indicated the square to be sprayed as defined by peripheral edges 46. The sprayer is indicated at 47. Lines 48 and 49, for example, are passed through apertures 36 and 40 respectively. The relative areas of apertures 36 and 40, only two apertures being referred to for simplicity, should be a function of the length of lines 48 and 49; taking the area of aperture 36 as unity or 1.0, the area of aperture 40 should be 1.4. The area of the intermediate apertures is proportioned and will fall between 1.0 as a minimum and 1.4 as a maximum. In case one first drills the holes and then presses out the head member to provide the circular portion 26, it may be necessary to vary the apertures slightly due to the deformation when the portion is pressed outwardly.

The spray device so far described will lay down a curtain of liquid in the form of a plurality of jets which will strike the area about the sprayer in the form of a square. To ensure that the area between the sprayer and each edge of the square will receive a liquid application, I preferably mount vane member 51 to rotate on a stud member 52. One end of the stud member is riveted over as at 53 upon the head member, while the other end of the stud member is suitably threaded to receive a nut 54 and lock the vane member 51 in place for rotation. The vane member includes a plurality of vanes 57; each vane extends outwardly sufficiently to be struck by the liquid jets from the apertures, the face of each vane being curved so the vane member is rotated. The outer edge 58 of each vane is serrated to assist in breaking up the liquid stream and apply it in the form of a fine spray. As the vane member rotates, some jets pass between the vanes and so discharge at the edge of the square. Other jets are periodically interrupted and to a varying extent by striking the vanes and the serrated edges of each vane so that the entire area about the sprinkler receives a uniform water application, the area sprayed being square in outline.

By providing the various apertures about the central longitudinal axis in a circular pattern and of sizes varying proportionately to their respective distances from the edge of the area to be sprayed, the sprayer can be made to lay down a liquid application on an area in the form of a rectangle in which the alternate pair sides are unequal in length instead of being of equal length as in a square. In this case the apertures are proportional to the distance measured to the edge of the area. When the shortest perpendicular distance from the edge of the rectangle to the central axis is taken as unity, and the area of the aperture on this line is taken as unity, then the area of other apertures will be related to the first aperture as the secant of the included angle is related to one.

The vanes 57 are positioned at a suitable angle (1) with respect to the direction of the jets issuing from the apertures 29 and (2) with respect to the horizontal so that the jets are effective to rotate the vane member and the latter is effective to spread the liquid striking it over the area between the sprinkler and the outer edge of the area sprayed. The angle of the vanes to the horizontal can be about 25° although this pitch can be varied, depending on the angle between the vanes and the jets. The several serrations on the outer edge 58 assist in breaking up the jets and in distributing the fluid uniformly over the sprayed area.

I claim:

1. A sprinkler for spraying a liquid onto a rectangular area measured about the central longitudinal axis of the sprinkler, the sprinkler comprising a body having an aperture therein, a head member positioned over said aperture, said head member having a plurality of spray apertures arranged about said central longitudinal axis of said sprinkler, each spray aperture being of a diameter proportionate approximately to the distance measured from the axis to the edge of the rectangular area to be sprayed, and a vane member mounted on said head member to rotate about said axis, said vane member comprising a plurality of circumferentially spaced pitched vanes positioned outwardly beyond said spray apertures in the paths of sprays issuing therefrom, said vanes being operable by sprays issuing from said spray orifices for rotating said vane member to cause said vanes and the spaces therebetween to pass alternately over said spray apertures, whereby the spray pattern is determined both by liquid which passes through said spaces without impinging on said vanes and by liquid which impinges on and is deflected by said vanes.

2. A sprinkler for spraying a liquid onto a rectangular area about the central longitudinal axis of the sprinkler, the sprinkler comprising a body having an aperture therein, conduit means for supplying liquid to be sprayed to said aperture, and a head member positioned and sealed over said aperture, said head member having a portion thereof extending upwardly and inwardly toward said axis at an included angle with said axis of less than 90°, said portion being generally concentric about said axis and including a plurality of liquid spray apertures therein and of different areas arranged concentrically about said axis, the area of each aperture being proportional to the distance from the aperture to the peripheral edge of the rectangular area to be sprayed measured along a radius passed through the axis and the selected aperture, and a vane member mounted on said head member to rotate about said axis, said vane member comprising a plurality of circumferentially spaced pitched vanes positioned outwardly beyond said spray apertures in the paths of sprays issuing therefrom, said vanes being operable by sprays issuing from said spray orifices for rotating said vane member to cause said vanes and the spaces therebetween to pass alternately over said spray apertures, whereby the spray pattern is determined both by liquid which passes through said spaces without impinging on said vanes and by liquid which impinges on and is deflected by said vanes, each of said vane members being positioned at an angle of about 25° to a plane normal to said longitudinal axis and having at least one edge along each member formed with a plurality of serrations.

HARVEY GORDON HANSEN.

REFERENCES CITED

The following references are of record in the file of this patent:

UNITED STATES PATENTS

| Number | Name | Date |
|---|---|---|
| 513,957 | Rundquist | Jan. 30, 1894 |
| 1,183,150 | Williams | May 16, 1916 |
| 1,214,038 | Humphrey | Jan. 30, 1917 |
| 1,539,331 | Siemann | May 26, 1925 |
| 2,270,595 | Lewis | Jan. 20, 1942 |